March 6, 1951 W. S. RAMSAY 2,543,987
METHOD OF PRODUCING POROUS, LIGHTWEIGHT, BURNED
ARGILLACEOUS MATERIAL
Filed Aug. 23, 1947
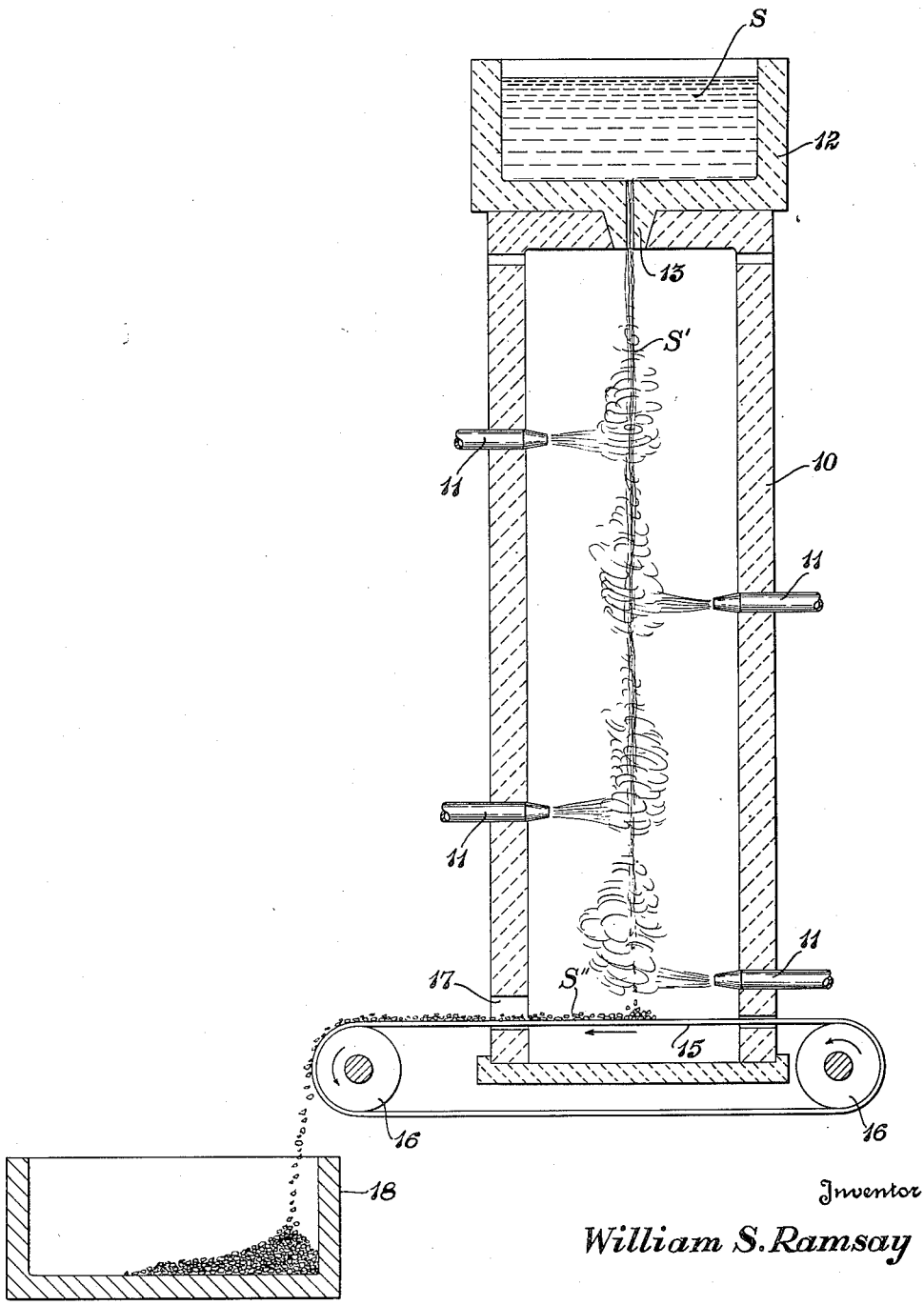
Inventor
William S. Ramsay
By Frease and Bishop
Attorneys

Patented Mar. 6, 1951

2,543,987

UNITED STATES PATENT OFFICE 2,543,987

METHOD OF PRODUCING POROUS, LIGHT-WEIGHT, BURNED ARGILLACEOUS MATERIAL

William S. Ramsay, Canton, Ohio, assignor, by mesne assignments, to Stark Ceramics, Inc., Canton, Ohio, a corporation of Ohio Application August 23, 1947, Serial No. 770,266

23 Claims. (Cl. 106—40)

The invention relates to the manufacture of porous, light-weight material, suitable for use as an aggerate for concrete, or as a grog for the making of bricks or other burned clay bodies or forms or as a filler for rubber of plastic materials, from a raw material such as clay or shale.

In the forming of concrete bodies or structures, it is necessary that a large percentage of aggregate be mixed with the cement which forms a binder for the lumps of aggregate in the finished structure.

Since the aggregate forms a large part of the finished concrete body or structure, it is desirable that the weight of the aggregate be reduced as much as possible without impairing the strength of the structure.

To this end limited quantities of aggregates for this purpose have been produced from burned clay and the like, but while such burned, argillaceous aggregates as are now in use have sufficient strength for the purpose and weigh considerably less than the aggregates commonly used for this purpose in standard practice, the relatively large volume of aggregates used comprises a considerable portion of the over-all weight of the finished concrete structure or body and any reduction which can be made in the weight of such aggregates is therefore desirable.

Also in the manufacture of bricks and other burned clay forms or bodies, it is common practice to mix with the raw clay, a certain amount of burned clay grog and the present invention further contemplates the provision of a porous, light-weight grog for such use.

The object of the present invention is to provide a method for producing a burned argillaceous material suitable for use as an aggregate in the building of concrete structures or bodies, or as a grog in the manufacture of bricks or other burned clay forms or bodies or as a filler for rubber or plastic material, and which is very porous and of considerably lighter weight than aggregate or grogs now in use, whereby the weight of the concrete or burned clay forms or bodies may be greatly reduced without sacrificing strength.

Another object is to provide a method for producing such porous, light-weight, burned, argillaceous material which consists in mixing raw argillaceous material with water to form a slurry and pouring the slurry in a thin stream through a tube or shaft furnace at a temperature sufficient to rapidly burn the material to produce hard, light-weight, porous lumps.

Still another object of the invention is to provide such a method in which a relatively small amount of a deflocculating agent, such as sodium silicate, may be mixed with the raw clay and water in order to greatly reduce the amount of water required to form a slurry capable of being poured in a thin stream.

A further object is to provide such a method in which a small amount of a foaming agent may be mixed with the slurry so as to increase the porosity of the burned, argillaceous material.

A still further object is to provide such a method in which the slurry is violently agitated to beat air into the mixture in order to increase the porosity of the finished material.

Another object is to provide such a method in which the raw clay or shale may first be ground to required fineness, before mixing with the water, if the condition of the raw argillaceous material makes such grinding necessary or desirable.

A further object of the invention is to provide a method such as above referred to in which powdered carbonaceous material is mixed in the slurry which is then poured in a thin stream through a furnace shaft or tube, the carbonaceous fuel being rapidly burned as the stream passes through the furnace, resulting in a burned argillaceous aggregate of less weight and greater strength.

The above objects together with others which will be apparent from the following description or which may be later referred to, may be attained by carrying out the improved method of producing porous, light-weight, burned, argillaceous material in the manner hereinafter described in detail, reference being had to the accompanying drawing in which the figure is merely a schematic view showing a furnace and associated apparatus which may be used in carrying out the method to which the invention pertains.

In carrying out the method raw argillaceous material, preferably a plastic or semi-plastic clay or shale, is mixed with a sufficient amount of water to form a slurry. In some cases the raw clay or shale, in the condition in which it is taken from the ground, may be mixed directly with the water, but if the condition of the clay or shale does not permit this it may first be ground to sufficient fineness so that it will readily mix with the water to form a slurry. For this purpose grinding the raw material to about 14 mesh has been found sufficient.

The raw clay or shale and water are mixed together in such proportions as to form a slurry which may be easily poured in a stream when the materials are thoroughly mixed. In order to considerably reduce the proportion of water required, a small amount of a deflocculating agent may be mixed with the water and raw argillaceous material. The deflocculating agent used is preferably sodium silicate, although various other materials may be used as a deflocculating agent, such as any of the sodium phosphates, sodium carbonate or tannic acid.

The ingredients are preferably mixed together in the proportions of about 70% to 75% of argillaceous material to about 25% to 30% of water and about 1/10 of 1% of deflocculating agent, in order to produce a slurry which may be easily poured in a stream. If no deflocculating agent is used the amount of water required is considerably greater.

This mixture is then poured in a thin stream through a tube or shaft furnace of such height, and maintained at such temperature, that the moisture will be substantially removed from the stream of slurry before it strikes the hearth of the furnace and the argillaceous material will be almost instantaneously burned forming small irregular shaped lumps of porous, light-weight, burned material upon the hearth of the furnace.

If the tube or shaft of the furnace is of sufficient height, and maintained at sufficiently high temperature, the burning of the material may be completed before it reaches the hearth, but in any event the burning is very rapid.

The temperature at which the furnace is operated will depend upon the nature of the argillaceous material used and may be within a range of about 1500° F. to about 2500° F. Where a high grade fire clay, such as Ohio No. 5 fire clay, is used good results have been obtained by maintaining the furnace temperature at about 2200° F., but where shale or lower grades of clay are used, the temperature of the furnace may be proportionately lower.

For the purpose of illustrating the manner in which the improved method is carried out, the drawing shows more or less schematically or diagrammatically a tube or shaft furnace and associated apparatus for producing the invention.

A tube or shaft furnace is indicated generally at 10, arranged to be heated in any conventional manner, preferably so as to produce an oxidizing atmosphere within the shaft. For this purpose oil or gas burners 11 are indicated extending into the interior of the furnace shaft for producing the desired temperature therein, although it should be understood that the furnace may be heated in any other conventional manner with coal, electricity or other fuel.

A receptacle 12 is shown supported at the top of the furnace tube or shaft for containing the slurry, indicated generally at S, and is provided at its bottom with a nozzle 13 through which the slurry may be continuously discharged in a thin stream as indicated at S' downward through the furnace shaft or tube 10.

In order to remove the burned argillaceous material from the lower end of the tube or shaft the furnace is preferably provided with a movable hearth, which for the purpose of illustration, is shown as a continuous conveyor 15 mounted upon pulleys or sprockets 16 traveling in the direction of the arrows shown in the drawing, for continuously discharging the porous, light-weight lumps of burned argillaceous material, indicated at S'', through the discharge opening 17 of the furnace and depositing them in a bin or receptacle 18.

When producing a material for use as an aggregate in the forming of concrete structures or bodies, the raw argillaceous material used may be shale or lower grades of clay. The raw material may be ground if necessary, as above described, and is mixed with the water forming a slurry and in order to reduce the amount of water required, a small amount of sodium silicate or other deflocculating agent may be added in the proportions above given.

This slurry is placed in the receptacle 12 from which it is discharged in a thin stream through the furnace tube or stack in the manner above described and the porous, light-weight lumps of burned argillaceous material which are produced in this manner may be crushed to about quarter inch size for use as an aggregate in concrete work.

It has been found that this produces a very satisfactory aggregate which is considerably lighter in weight than the aggregates obtained under present practice, the weight of the aggregate obtained by this method being about 33 pounds per cubic foot as compared with about 70 pounds in standard practice, and about 54 pounds per cubic foot for such burned clay aggregates as have been made in the past.

It has been found that the character of such burned argillaceous material may be improved by the addition of a granular or powdered carbonaceous material, such as coal, coke or sawdust, to the slurry. This carbonaceous fuel will be ignited and rapidly burned as the stream of slurry passes through the furnace and will thus not only shorten the time required for burning the material but will cause expansion of the burning material resulting in greater porosity and lighter weight in the finished material as well as producing a harder, stronger material.

About 10% to 25% by weight of carbonaceous material, preferably coal reduced to about 14 mesh, is mixed with about 75% to 90% of raw argillaceous material, the preferred proportions being about 10% coal to about 90% clay or shale. Sufficient water is added to this mixture to form a slurry and a small amount of a deflocculating agent is preferably used to reduced the required amount of water, as above set forth.

About 70% to 75% of the mixture of raw argillaceous material and carbonaceous material and about 25% to 30% of water with about 1/10 of 1% of a deflocculating agent are mixed to produce the desired slurry which is then poured in a stream through the furnace shaft or tube as above described.

The carbonaceous material in the stream will immediately ignite and burn as the stream passes through the furnace, the burning fuel producing gases which will expand the argillaceous material, increasing its porosity and decreasing its weight, while the additional burning produces a harder, stronger burned argillaceous material. Where such carbonaceous material is used the weight of the burned aggregate is reduced to 30 pounds per cubic foot or less.

In the manufacture of grog for use in the making of bricks or other burned clay forms or bodies, the raw argillaceous material should be a higher grade of clay, and where the grog is to be used in fire brick the raw material is preferably fire clay or kaolin.

In the making of such grog the raw argillaceous material with or without carbonaceous material, and water are mixed in the proportions above given to form a slurry to which may be added about 1/10 of 1% of sodium silicate or other deflocculating agent as above set forth and about 1/10 of 1% of a foaming agent such as saponin, soap bark or preferably alkyl aryl sulfonate.

The slurry is violently agitated to beat air into the mixture and is then poured in a thin stream through the furnace in the manner above described. In this case the porous lumps of burned material, which are formed in the furnace, are relatively smaller in size and more porous and lighter in weight than the burned argillaceous material produced for aggregate for concrete work.

The burned argillaceous material thus produced is crushed to about 14 mesh and makes a highly satisfactory grog for use in the manufacture of bricks and other burned clay forms or bodies and is about 65% lighter in weight than grog made from the same clay under standard practice, a cubic foot of the grog made by this method weighing only about 26 pounds. This material may also be used as a filler for rubber or plastic material, being crushed or ground to any necessary or desired fineness for this purpose.

I claim:

1. The method of producing an expanded, porous, light-weight burned argillaceous material suitable for use as an aggregate and the like, which comprises mixing a raw argillaceous material with water to form a slurry, and dropping the slurry in a thin free falling stream vertically through a furnace at a temperature sufficient to immediately produce expanded, porous, light-weight lumps of burned argillaceous material.

2. The method of producing an expanded, porous, light-weight burned argillaceous material suitable for use as an aggregate and the like, which comprises grinding a raw argillaceous material, mixing the ground material with water to form a slurry, and dropping the slurry in a thin free falling stream vertically through a furnace at a temperature sufficient to immediately produce expanded, porous, light-weight lumps of burned argillaceous material.

3. The method of producing an expanded, porous, light-weight burned argillaceous material suitable for use as an aggregate and the like, which comprises mixing a raw argillaceous material with water and a small amount of a deflocculating agent to form a slurry, and dropping the slurry in a thin free falling stream vertically through a furnace at a temperature sufficient to immediately produce expanded, porous, light-weight lumps of burned argillaceous material.

4. The method of producing an expanded, porous, light-weight burned argillaceous material suitable for use as an aggregate and the like, which comprises grinding a raw argillaceous material, mixing the ground material with water and a small amount of a deflocculating agent to form a slurry, and dropping the slurry in a thin free falling stream vertically through a furnace at a temperature sufficient to immediately produce expanded, porous, light-weight lumps of burned argillaceous material.

5. The method of producing an expanded, porous, light-weight burned argillaceous material suitable for use as an aggregate and the like, which comprises mixing a raw argillaceous material with water to form a slurry, adding a small amount of a foaming agent to the slurry, and dropping the slurry in a thin free falling stream vertically through a furnace at a temperature sufficient to immediately produce expanded, porous, light-weight lumps of burned argillaceous material.

6. The method of producing an expanded, porous, light-weight burned argillaceous material suitable for use as an aggregate and the like, which comprises grinding a raw argillaceous material, mixing the ground material with water to form a slurry, adding a small amount of a foaming agent to the slurry, and dropping the slurry in a thin free falling stream vertically through a furnace at a temperature sufficient to immediately produce expanded, porous, light-weight lumps of burned argillaceous material.

7. The method of producing an expanded, porous, light-weight burned argillaceous material suitable for use as an aggregate and the like, which comprises grinding a raw argillaceous material, mixing the ground material with water and a small amount of a deflocculating agent to form a slurry, adding a small amount of a foaming agent to the slurry, and dropping the slurry in a thin free falling stream vertically through a furnace at a temperature sufficient to immediately produce expanded porous, light-weight lumps of burned argillaceous material.

8. The method of producing an expanded, porous, light-weight burned argillaceous material suitable for use as an aggregate and the like, which comprises mixing a raw argillaceous material with water to form a slurry, and dropping the slurry in a thin free falling stream vertically through a furnace at a temperature between 1500° F. and 2500° F. so as to immediately produce expanded, porous, light-weight lumps of burned argillaceous material.

9. The method of producing an expanded, porous, light-weight burned argillaceous material suitable for use as an aggregate and the like, which comprises mixing 70% to 75% of a raw argillaceous material with 25% to 30% of water and about two-tenths of one per cent of a deflocculating agent to form a slurry, and dropping the slurry in a thin free falling stream vertically through a furnace at a temperature sufficient to immediately produce expanded, porous, light-weight lumps of burned argillaceous material.

10. The method of producing an expanded, porous, light-weight burned argillaceous material suitable for use as an aggregate and the like, which comprises mixing 70% to 75% of a raw argillaceous material with 25% to 30% of water and about two-tenths of one percent of sodium silicate to form a slurry, and dropping the slurry in a thin free falling stream vertically through a furnace at a temperature sufficient to immediately produce expanded, porous, light-weight lumps of burned argillaceous material.

11. The method of producing an expanded, porous, light-weight burned argillaceous material suitable for use as an aggregate and the like, which comprises mixing a raw argillaceous material with water and a small amount of sodium silicate to form a slurry, and dropping the slurry in a thin free falling stream vertically through a furnace at a temperature sufficient to immediately produce expanded, porous, light-weight lumps of burned argillaceous material.

12. The method of producing an expanded, porous, light-weight burned argillaceous material suitable for use as an aggregate and the like, which comprises mixing 70% to 75% of a raw argillaceous material with 25% to 30% of water and about two-tenths of one per cent of a deflocculating agent to form a slurry, adding about one-tenth of one per cent of a foaming agent to the slurry, and dropping the slurry in a thin free falling stream vertically through a furnace at a temperature sufficient to immediately produce expanded, porous, light-weight lumps of burned argillaceous material.

13. The method of producing an expanded, porous, light-weight burned argillaceous material suitable for use as an aggregate and the like, which comprises mixing a raw, high grade fire clay with water and a small amount of a deflocculating agent to form a slurry, adding a small amount of a foaming agent to the slurry and dropping the slurry in a thin free falling stream vertically through a furnace at a temperature of about 2200° F. so as to immediately produce expanded, porous, light-weight lumps of burned fire clay.

14. The method of producing an expanded, porous, light-weight burned argillaceous material suitable for use as an aggregate and the like, which comprises mixing a raw argillaceous material with water and a small amount of a deflocculating agent to form a slurry, adding a small amount of a foaming agent to the slurry, violently agitating the slurry to beat air into the mixture, and dropping the slurry in a thin free falling stream vertically through a furnace at a temperature sufficient to immediately produce expanded, porous, light-weight lumps of burned argillaceous material.

15. The method of producing an expanded, porous, light-weight burned argillaceous material suitable for use as an aggregate and the like, which comprises grinding a raw argillaceous material, mixing the ground material with water and a small amount of a deflocculating agent to form a slurry, adding a small amount of a foaming agent to the slurrry, violently agitating the slurry to beat air into the mixture, and dropping the slurry in a thin free falling stream vertically through a furnace at a temperature sufficient to immediately produce expanded, porous, light-weight lumps of burned argillaceous material.

16. The method of producing an expanded, porous, light-weight burned argillaceous material suitable for use as an aggregate and the like, which comprises mixing a raw argillaceous material with water to form a slurry, violently agitating the slurry to beat air into the mixture, and dropping the slurry in a thin free falling stream vertically through a furnace at a temperature sufficient to immediately produce expanded, porous, light-weight lumps of burned argillaceous material.

17. The method of producing an expanded, porous, light-weight burned argillaceous material suitable for use as an aggregate and the like, which comprises mixing a raw argillaceous material and a carbonaceous material with water to form a slurry, and dropping the slurry in a thin free falling stream vertically through a furnace at a temperature sufficient to immediately produce expanded porous, light-weight lumps of burned argillaceous material.

18. The method of producing an expanded, porous, light-weight burned argillaceous material suitable for use as an aggregate and the like, which comprises mixing a raw argillaceous material and a carbonaceous material with water and a small amount of a deflocculating agent to form a slurry, and dropping the slurry in a thin free falling stream vertically through a furnace at a temperature sufficient to immediately produce expanded, porous, light-weight lumps of burned argillaceous material.

19. The method of producing an expanded, porous, light-weight burned argillaceous material suitable for use as an aggregate and the like, which comprises mixing a raw argillaceous material and a carbonaceous material with water to form a slurry, adding a small amount of a foaming agent to the slurry, and dropping the slurry in a thin free falling stream vertically through a furnace at a temperature sufficient to immediately produce expanded, porous, light-weight lumps of burned argillaceous material.

20. The method of producing an expanded, porous, light-weight burned argillaceous material suitable for use as an aggregate and the like, which comprises mixing a raw argillaceous material and a carbonaceous material with water and a small amount of a deflocculating agent to form a slurry, adding a small amount of a foaming agent to the slurry, and dropping the slurry in a thin free falling stream vertically through a furnace at a temperature sufficient to immediately produce expanded, porous, light-weight lumps of burned argillaceous material.

21. The method of producing an expanded, porous, light-weight burned argillaceous material suitable for use as an aggregate and the like, which comprises mixing a row argillaceous material with water and dropping the mixture in a thin free falling stream vertically into a furnace at a temperature sufficient to immediately remove the moisture from the mixture and rapidly burning the argillaceous material so as to produce expanded, porous, light-weight lumps of burned argillaceous material.

22. The method of producing an expanded, porous, light-weight burned argillaceous material suitable for use as an aggregate and the like, which comprises mixing a raw argillaceous material with water and a small amount of a deflocculating agent and dropping the mixture in a thin free falling stream vertically into a furnace at a temperature sufficient to immediately remove the moisture from the mixture and rapidly burning the argillaceous material so as to produce expanded, porous, light-weight lumps of burned argillaceous material.

23. The method of producing an expanded, porous, light-weight burned argillaceous material suitable for use as an aggregate and the like, which comprises mixing a raw finely divided, argillaceous material with water to form a slurry and dropping the slurry in a thin free falling stream vertically through a furnace at a temperature between 1500° F. and 2500° F. so as to rapidly remove all moisture from the slurry and immediately burn the material to produce expanded, porous, light-weight lumps of burned argillaceous material.

WILLIAM S. RAMSAY.

REFERENCES CITED

The following references are of record in the file of this patent:

UNITED STATES PATENTS

| Number | Name | Date |
|---|---|---|
| 1,557,921 | Buel | Oct. 20, 1925 |
| 1,699,451 | Rigby | Jan. 15, 1929 |
| 1,702,076 | Ericson | Feb. 12, 1929 |
| 1,944,007 | Hobart | Jan. 16, 1934 |
| 2,038,251 | Vogt | Apr. 21, 1936 |
| 2,090,868 | Hyde | Aug. 24, 1937 |
| 2,095,183 | Dyckerhoff | Oct. 5, 1937 |
| 2,103,746 | Guth | Dec. 28, 1937 |
| 2,151,932 | Nielsen | Mar. 28, 1939 |
| 2,242,443 | Stanko | May 20, 1941 |
| 2,271,845 | Parsons | Feb. 3, 1942 |
| 2,400,087 | Harth | May 14, 1946 |
| 2,430,601 | Cleary | Nov. 11, 1947 |

FOREIGN PATENTS

| Number | Country | Date |
|---|---|---|
| 209,057 | Great Britain | 1923 |